United States Patent
Beck et al.

(10) Patent No.: US 11,117,222 B2
(45) Date of Patent: Sep. 14, 2021

(54) METHOD AND DEVICE FOR PROCESSING COOLING HOLE ON WORKPIECE WITH LASER

(71) Applicant: Siemens Aktiengesellschaft, Munich (DE)

(72) Inventors: Thomas Beck, Panketal (DE); Hong Tao Li, Beijing (CN)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 422 days.

(21) Appl. No.: 15/500,603

(22) PCT Filed: Nov. 10, 2014

(86) PCT No.: PCT/CN2014/090738
§ 371 (c)(1),
(2) Date: Jan. 31, 2017

(87) PCT Pub. No.: WO2016/074135
PCT Pub. Date: May 19, 2016

(65) Prior Publication Data
US 2017/0232559 A1  Aug. 17, 2017

(51) Int. Cl.
*B23K 26/384* (2014.01)
*B23K 26/382* (2014.01)
(Continued)

(52) U.S. Cl.
CPC ........ *B23K 26/384* (2015.10); *B23K 26/0624* (2015.10); *B23K 26/389* (2015.10); *B23K 2101/001* (2018.08)

(58) Field of Classification Search
CPC ..................................................... B23K 26/384
(Continued)

(56) References Cited

U.S. PATENT DOCUMENTS 6,307,175 B1  10/2001  Blochlinger et al.
6,420,677 B1   7/2002  Emer et al.
(Continued)

FOREIGN PATENT DOCUMENTS

CN    1234310 A   11/1999
CN  101119826 A    2/2008
(Continued)

OTHER PUBLICATIONS

Chinese Office Action dated Jun. 25, 2019.
(Continued)

*Primary Examiner* — Thien S Tran
(74) *Attorney, Agent, or Firm* — Harness, Dickey & Pierce, P.L.C.

(57) ABSTRACT

A method is for processing a cooling hole on a workpiece with laser. The cooling hole includes a shaped hole section. The method includes emitting a first laser pulse to a rough processing part in the position of the shaped hole section to be processed on the workpiece according to the geometrical parameters of the shaped hole section so as to remove the material of the workpiece; and emitting a second laser pulse to the processing allowance part beyond the rough processing part of the shaped hole section to be processed according to the geometrical parameters of the shaped hole section so as to remove the material allowance of the workpiece on the processing allowance part. The energy of the first laser pulse is relatively larger than that of the second laser pulse.

23 Claims, 6 Drawing Sheets

(51) Int. Cl.
*B23K 26/0622* (2014.01)
*B23K 101/00* (2006.01)

(58) Field of Classification Search
USPC .................................................. 219/121.71
See application file for complete search history.

(56) References Cited

U.S. PATENT DOCUMENTS

| | | | |
|---|---|---|---|
| 6,744,010 B1 | 6/2004 | Pepe et al. | |
| 6,809,291 B1 | 10/2004 | Neil et al. | |
| 7,041,933 B2 | 5/2006 | Forrester et al. | |
| 7,816,625 B2* | 10/2010 | Beck | B23K 26/0622 |
| | | | 219/121.71 |
| 9,597,751 B2* | 3/2017 | Bolms | B23K 26/389 |
| 2002/0104831 A1 | 8/2002 | Chang et al. | |
| 2004/0200807 A1 | 10/2004 | Forrester et al. | |
| 2007/0025852 A1 | 2/2007 | Camhi et al. | |
| 2008/0197120 A1* | 8/2008 | Beck | B23K 26/384 |
| | | | 219/121.71 |
| 2009/0067998 A1 | 3/2009 | Beck | |
| 2009/0283508 A1* | 11/2009 | Bolms | B23K 26/382 |
| | | | 219/121.71 |
| 2011/0036819 A1 | 2/2011 | Munzer et al. | |
| 2011/0132883 A1* | 6/2011 | Sheng | B23K 26/384 |
| | | | 219/121.72 |
| 2011/0142084 A1 | 6/2011 | Reid et al. | |
| 2012/0102959 A1* | 5/2012 | Starkweather | B23K 26/389 |
| | | | 60/752 |
| 2013/0020294 A1 | 1/2013 | Elfizy et al. | |
| 2013/0269354 A1 | 10/2013 | Starkweather et al. | |

FOREIGN PATENT DOCUMENTS

| | | |
|---|---|---|
| CN | 101332559 A | 12/2008 |
| CN | 101992352 A | 3/2011 |
| CN | 103990910 A | 8/2014 |
| CN | 104131900 A | 11/2014 |
| DE | 102004034721 A1 | 2/2006 |
| EP | 1681128 A1 | 7/2006 |
| EP | 2428646 A1 | 3/2012 |

OTHER PUBLICATIONS

International Search Report dated Aug. 14, 2015.
Extended European Search Report dated Jun. 13, 2018.
Chinese Office Action dated Feb. 24, 2018.
European Office Action for corresponding European Application No. 14905737.4 dated Feb. 7, 2020.
European Office Action for corresponding European Application No. 14905737.4 dated Nov. 23, 2020.

* cited by examiner

METHOD AND DEVICE FOR PROCESSING COOLING HOLE ON WORKPIECE WITH LASER

PRIORITY STATEMENT

This application is the national phase under 35 U.S.C. § 371 of PCT International Application No. PCT/CN2014/090738 which has an International filing date of Nov. 10, 2014, which designated the United States of America, the entire contents of which are hereby incorporated herein by reference.

FIELD

An embodiment of the present invention generally relates to a laser processing method and/or device, in particular to a method and/or device for making a cooling hole in a workpiece using laser pulses.

BACKGROUND ART

Laser processing is highly efficient, is not affected by the attributes of the material being processed, and has reliable processing quality, so is used in many technical fields. For example, there are already technologies which use laser pulses to make holes in certain components of compressors, fuel injection nozzles, and the blades (including moving blades and static blades) of aviation engines and industrial gas turbines. For example, taking blades as an example, these are generally hollow components made from a high-temperature alloy material; they have a high operating temperature, and bear large loads. It is generally necessary to form multiple cooling holes, made using laser pulses, in the blades, in order to continuously cool the blades.

SUMMARY

One embodiment of the present invention discloses a method for making a cooling hole in a workpiece using laser light, the cooling hole comprising a shaped hole part, and the method comprising: emitting a first laser pulse to a rough processing part at the position on the workpiece where the shaped hole part is to be made, according to geometric parameters of the shaped hole part, to remove material of the workpiece at the rough processing part, and complete rough processing of the shaped hole part; and emitting a second laser pulse to a processing remainder part other than the rough processing part of the shaped hole part, according to geometric parameters of the shaped hole part, to remove remaining material of the workpiece at the processing remainder part, and complete fine processing of the shaped hole part; wherein the energy of the first laser pulse is greater than the energy of the second laser pulse. It must be explained here that the processing remainder part of the shaped hole part is a region other than the rough processing part of the shaped hole part. Here, "geometric parameters" of the shaped hole part include the geometric shape and size etc. of the shaped hole part.

Another embodiment of the present invention further discloses a device for making a cooling hole in a workpiece using laser light, the cooling hole comprising a shaped hole part, the device comprising: a shaped hole part rough processing unit, for emitting a first laser pulse to a rough processing part of the shaped hole part, according to geometric parameters of the shaped hole part, to remove material of the workpiece at the rough processing part, and complete rough processing of the shaped hole part; and a shaped hole part fine processing unit, for emitting a second laser pulse to a processing remainder part of the shaped hole part, according to geometric parameters of the shaped hole part, to remove remaining material of the workpiece at the processing remainder part, and complete fine processing of the shaped hole part; wherein the energy of the first laser pulse is greater than the energy of the second laser pulse.

Another embodiment of the present invention further discloses a system for making a cooling hole in a workpiece, the system comprising: a laser, for generating a laser pulse onto the workpiece; and a controller, in which is stored a program for realizing an embodiment of the abovementioned method for making a cooling hole in a workpiece.

Another embodiment of the present invention further discloses a machine readable storage medium, characterized by storing commands for making the machine perform an embodiment of the abovementioned method.

Figure 1:
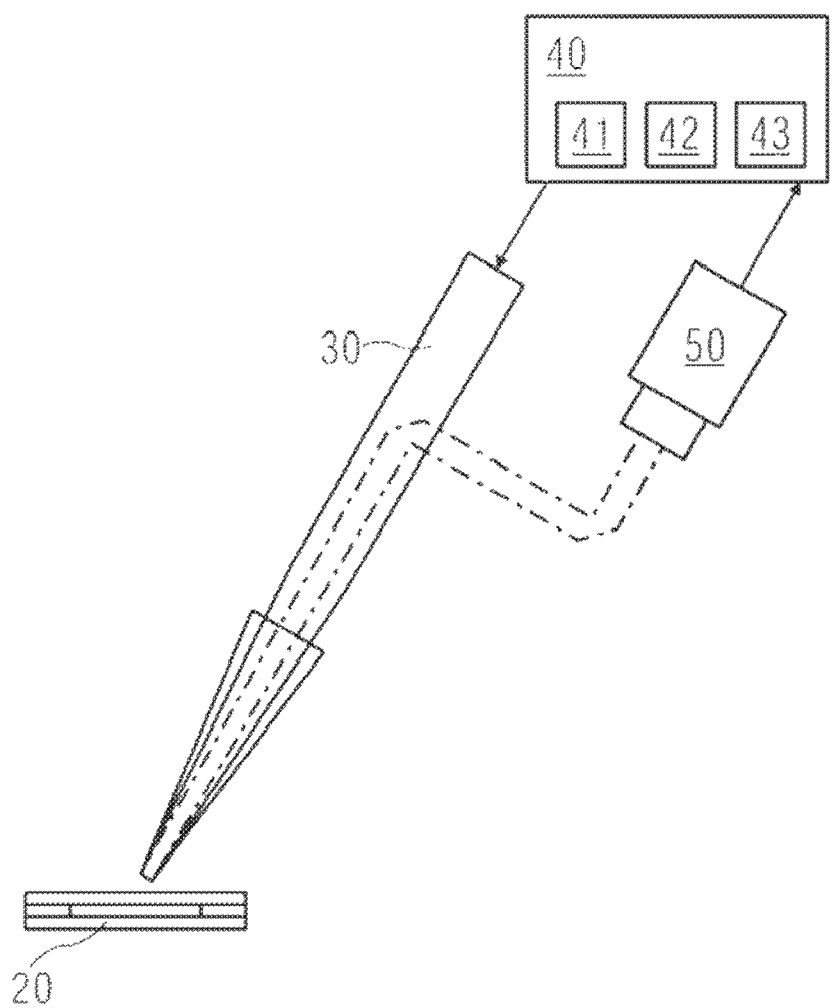
FIG. 1 is a system for making a cooling hole in a workpiece.

List of names and numbers of components in the figures:
Workpiece 20, laser 30, controller 40, camera 50, cooling hole 10, shaped hole part 11, rough processing part 11A of shaped hole part 11, processing regions 11A1, 11A2, 11A3 and 11A4 of rough processing part 11A, processing remainder part 11B of shaped hole part, round hole part 12, shaped hole part rough processing unit 41, shaped hole part fine processing unit 42, round hole part processing unit 43

DETAILED DESCRIPTION OF THE EXAMPLE EMBODIMENTS

To clarify the object, technical solution and advantages of the embodiments of the present invention, embodiments of the present invention are explained in further detail below by way of examples.

FIG. 1 is a system for making a cooling hole in a workpiece. A controller 40 controls a laser 30 to generate a laser pulse which is emitted through a nozzle onto a workpiece in which a cooling hole is to be made. Material in a processing region of the workpiece 20 is heated, melted and evaporated by the laser beam that is shot onto said material. A program of the method for making a cooling hole according to an embodiment of the present invention may be stored in the controller 40, for controlling the laser 30 to generate a laser pulse. Furthermore, the system described above may also comprise an image sensor 50, which collects visible light emitted by the processing region of the workpiece 20, and forms an image of the processing region and transmits said image to the controller 40; the controller can determine whether processing is complete based on the image of the processing region.

Figure 2:
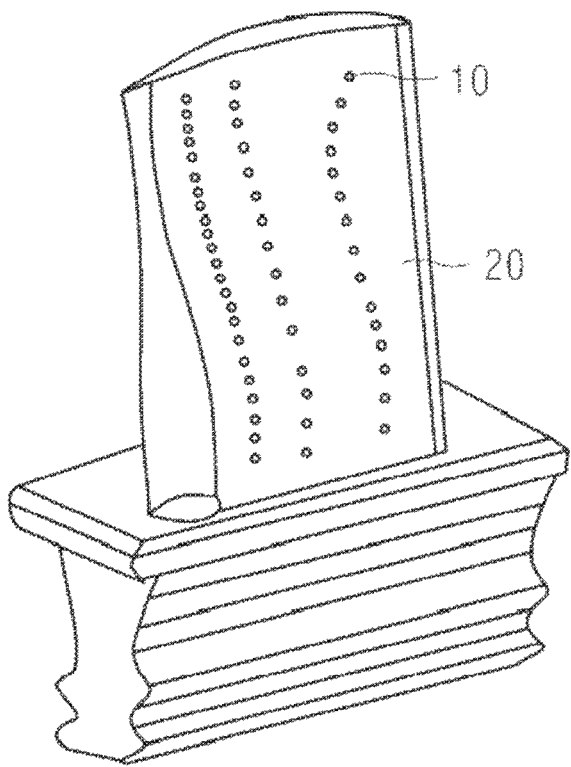
FIG. 2 is a workpiece with cooling holes—a blade.
Figure 3:
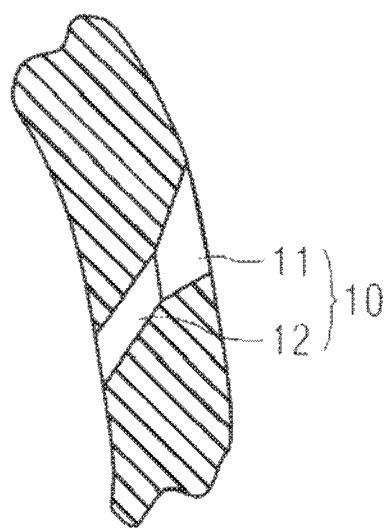
FIG. 3 is a sectional view of a cooling hole in the workpiece in FIG. 2.

FIG. 2 is a workpiece with cooling holes—a blade. FIG. 3 is a sectional view of a cooling hole in the workpiece in FIG. 2. It can be seen from FIGS. 2 and 3 that multiple cooling holes 10 made using laser pulses are formed in the blade. One type of cooling hole may be a gas film hole, mainly comprising a shaped hole part 11. The shaped hole part 11 has a special shape, for example trapezoidal or rectangular, which is used to form a gas film of cooling air on a wall surface of the shaped hole part 11, to cool the blade effectively. The cooling hole 10 may also comprise a round hole part 12, for guiding cooling air, and causing it to enter the shaped hole part 11.

Figure 4:
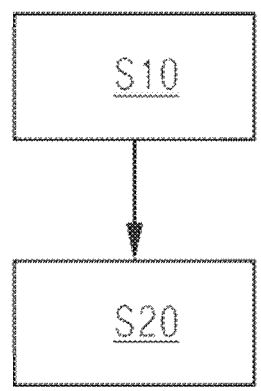
FIG. 4 is a flow chart of a method for making a cooling hole in a workpiece using laser light in an embodiment of the present invention.

FIG. 4 is a flow chart of a method for making a cooling hole in a workpiece using laser light in an embodiment of the present invention. The method for making a cooling hole in a workpiece using laser light comprises the following steps: S10, emitting a first laser pulse of high energy to a rough processing part 11A at the position on the workpiece where the shaped hole part 11 is to be made, according to geometric parameters of the shaped hole part 11, to remove material of the workpiece at the rough processing part 11A, and complete rough processing of the shaped hole part 11; and S20, emitting a second laser pulse of low energy to a processing remainder part 11B other than the rough processing part 11A of the shaped hole part 11, according to geometric parameters of the shaped hole part 11, to remove remaining material of the workpiece at the processing remainder part 11B, and complete fine processing of the shaped hole part 11.

Figure 5:
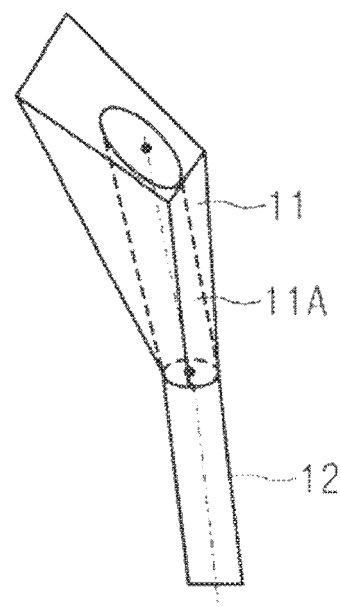
FIGS. 5 and 6 are schematic diagrams of different parts of a cooling hole made using laser pulses.
Figure 6:
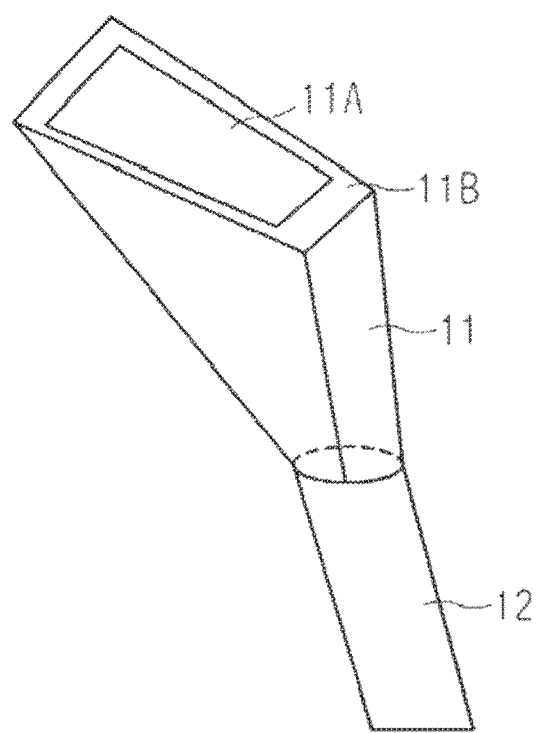
Figure 7A:
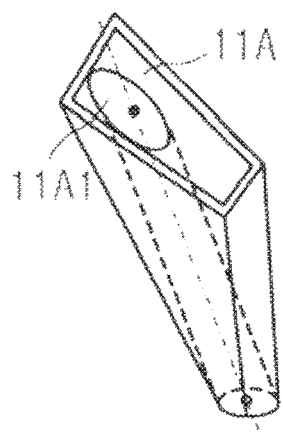
FIGS. 7A-7D are schematic diagrams of another method of making a cooling hole using laser pulses.
Figure 7B:
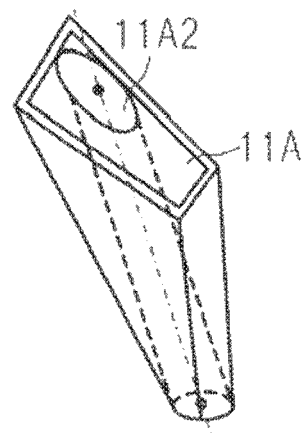
Figure 7C:
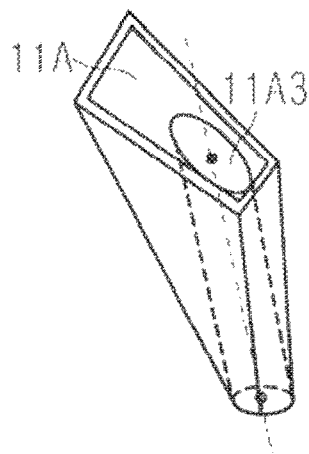
Figure 7D:
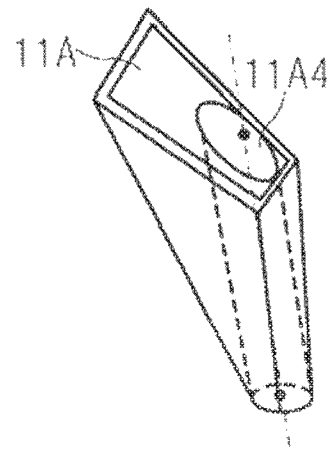

The way in which the method described above is implemented is explained below, taking the processing of cooling holes 10 in a blade 20 as an example. The method may use a model of a blade that has been pre-designed using existing computer aided manufacturing software, for example a 3D model of a blade manufactured using CAD software. The spatial positions, including three-dimensional spatial coordinates and angles, of cooling holes 10 in the blade may be obtained from the 3D model. The method may obtain geometric parameters of a shaped hole part 11 of a cooling hole 10, including the position, shape and size of the shaped hole part, from the 3D model of the blade. Based on the geometric parameters of the shaped hole part 11, and according to the process requirements for making the cooling hole, the rough processing part 11A may be defined, principally taking into account the processing precision requirements of the shaped hole part 11, i.e. the fine processing precision in step S20. For example, FIGS. 5 and 6 show a process of making a cooling hole 10. The shaped hole part 11 of the cooling hole is substantially trapezoidal, and based on experience and process requirements, a cylindrical region which is 3-5 mm distant from the edges of the trapezoidal shape may be defined as the rough processing part 11A. With regard to the rough processing part 11A based on definition, a fixed laser 30 may be controlled by the controller 40 to emit multiple first laser pulses to the rough processing part 11A of the shaped hole part, until all or most of the material of the blade 20 at the rough processing part 11A is removed, thereby completing rough processing of the shaped hole part 11. In this way, most of the blade material at the shaped hole part position can be removed. The first laser pulse may be a high peak power laser (HPPL), preferably a millisecond laser; by using an HPPL, the blade material at the rough processing part 11A can be removed rapidly.

As FIG. 6 shows, building upon the rough processing of the shaped hole part 11, a second laser pulse may be emitted to the processing remainder part 11B other than the rough processing part 11A of the shaped hole part 11 on the workpiece according to the geometric parameters shape, position and size of the shaped hole part 11, to remove remaining material of the blade at the processing remainder part 11B, and complete fine processing of the shaped hole part 11. In the fine processing step, a laser 30 (which may be different from the laser used in the process of rough processing of the shaped hole part 11 described above) generates the second laser pulse with a pulse energy smaller than that of the first laser pulse; preferably, the second laser pulse is of a level smaller than the nanosecond level (here, including the nanosecond level). The laser avoids the rough processing part 11A, i.e. moves back and forth according to a given path at the processing remainder part 11B, removing the material of the blade at the processing remainder part 11B layer by layer, to produce a contour consistent with the shaped hole part 11 of the cooling hole in the 3D model of the blade. A fine processing path defined by existing software such as UG (Unigraphic) may be used, or a fine processing path may be determined by a person based on experience. For example, when the shaped hole part 11 shown in FIG. 6 is made, a trapezoidal or oval path may be followed.

The method in the embodiment described above uses laser pulses of high energy to perform rough processing, removing most of the workpiece material that needs to be removed to make the cooling hole, and thereby reducing the amount of material that needs to be removed when laser pulses of low energy are used to perform fine processing. Thus, the total processing time of the cooling hole is reduced. Moreover, during fine processing, the method avoids the rough processing part 11A, only emitting laser pulses to the processing remainder part 11B, thus reducing the possibility of laser pulses striking an inside wall of the cooling hole 10, and thereby improving the processing quality of the cooling hole.

As shown in FIGS. 5 and 6, in another embodiment of the present invention, the cooling hole 10 may also comprise a round hole part 12 in communication with the shaped hole part 11. Correspondingly, the method for making such a cooling hole 10 comprises, in addition to steps S10 and S20 mentioned above: S30, emitting a first laser pulse of high energy to a position on the blade where the round hole part 12 is to be made, according to geometric parameters of the round hole part 12, to remove material of the blade 20 at the position where the round hole part 12 is to be made, and make the round hole part 12. Similarly to the rough processing of the shaped hole part 11, geometric parameters of the round hole part 12 of the cooling hole 10, including the position, shape and size of the round hole part, may be obtained from a 3D model of the blade. Laser pulses are emitted according to the geometric parameters of the round hole part 12. Here, the first laser pulse is also, correspondingly, preferably millisecond laser light.

It must be explained here that the numbering of the steps and the order of the explanations herein do not represent the order in which these steps are performed. For example, first of all a millisecond laser may be used to perform step S30 of making the round hole part 12, then step S10 of rough processing and step S20 of fine processing of the shaped hole part 11 may be performed. This order may be reversed; first of all, rough processing step S10 for making the shaped hole part 11 is performed, then step S30 of making the round hole part is performed, and finally, step S20 of fine processing of the shaped hole part is performed. Moreover, it is also possible for step S30 of making the round hole part to be performed once step S10 of rough processing and step S20 of fine processing of the shaped hole part 11 have been performed.

Figure 8:
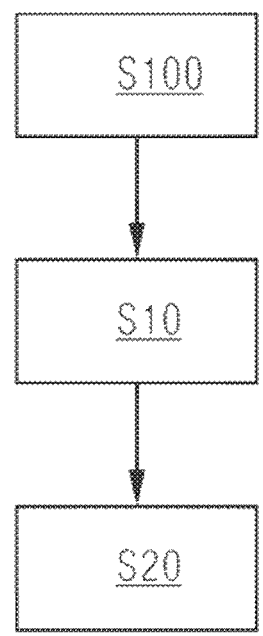
FIG. 8 is a flow chart of the method shown in FIGS. 7A-7D.

In an alternative example of the abovementioned method, rough processing of the shaped hole part may be implemented in the following way. FIGS. 7A-7D are schematic diagrams of another method of making a cooling hole using laser pulses. FIG. 8 is a flow chart of the method. The method comprises a step S100: selecting multiple processing regions at the rough processing part 11A according to geometric parameters of the shaped hole part 11, for example four processing regions 11A1, 11A2, 11A3 and 11A4, respectively fixing the laser 30, and emitting first laser pulses of high energy to the selected processing regions 11A1, 11A2, 11A3 and 11A4, to remove material of the workpiece at the rough processing part 11A, thereby completing rough processing of the shaped hole part (11). The positions and number of the processing regions on the rough processing part 11A is determined by the geometric parameters of the rough processing part 11A; the positions and number of the processing regions may be determined according to experience. As FIGS. 7A-7D show, multiple processing regions may be selected uniformly in different parts of the rough processing part 11A: top left, top right, bottom left and bottom right. The selection of the number and positions of processing regions must ensure that when laser pulses are emitted to these processing regions, all or most of the blade material within the rough processing part 11A can be removed. These processing regions may partially overlap.

S30, emitting a first laser pulse of high energy to a position on the blade where the round hole part 12 is to be made, according to geometric parameters of the round hole part 12, to remove material of the blade 20 at the position where the round hole part 12 is to be made, and make the round hole part 12.

Building upon the rough processing of the shaped hole part 11, a second laser pulse of low energy may be emitted to the processing remainder part 11B other than the rough processing part 11A of the shaped hole part 11 on the workpiece according to the geometric parameters shape, position and size of the shaped hole part 11, to remove remaining material of the blade at the processing remainder part 11B, and complete fine processing of the shaped hole part 11. After fine processing of the shaped hole part, S30 is performed in the abovementioned method: emitting a first laser pulse of high energy to a position on the blade where the round hole part 12 is to be made, according to geometric parameters of the round hole part 12, to remove material of the blade 20 at the position where the round hole part 12 is to be made, and make the round hole part 12. The fine processing step and round hole processing step described above are the same as those explained previously, so are not explained in detail again here.

Similarly, the numbering of the steps and the order of the explanations here do not represent the order in which these steps are performed. For example, first of all a millisecond laser may be used to perform step S30 of making the round hole part 12, then step S100 of rough processing and step S20 of fine processing of the shaped hole part 11 may be performed.

Another embodiment of the present invention also discloses a device for making a cooling hole in a workpiece using a laser, the device comprising: a shaped hole part rough processing unit 41, for emitting a first laser pulse of high energy to a rough processing part 11A at a position on the workpiece where a shaped hole part 11 is to be made, according to geometric parameters of the shaped hole part 11, to remove material of the workpiece at the rough processing part 11A, and complete rough processing of the shaped hole part 11; and a shaped hole part fine processing unit 42, for emitting a second laser pulse of low energy to a processing remainder part 11B of the shaped hole part 11, according to geometric parameters of the shaped hole part 11, to remove remaining material of the workpiece at the processing remainder part 11B, and complete fine processing of the shaped hole part 11.

In one embodiment of the present invention, the shaped hole part rough processing unit 41 is specifically for: selecting multiple processing regions 11A1, 11A2, 11A3 and 11A4 at the rough processing part 11A according to geometric parameters of the shaped hole part 11, and emitting first laser pulses to the selected processing regions 11A1, 11A2, 11A3 and 11A4, to remove material of the workpiece at the rough processing part 11A, thereby completing rough processing of the shaped hole part 11.

In one embodiment of the present invention, the device also comprises: a round hole part processing unit 43, for emitting a first laser pulse of high energy to a position on the workpiece where the round hole part 12 is to be made, according to geometric parameters of the round hole part 12, to remove material of the workpiece at the position where the round hole part 12 is to be made, and make the round hole part 12. The first laser pulse may be millisecond laser light; the second laser pulse may be laser light of a level smaller than the nanosecond level.

The shaped hole part rough processing unit 41, shaped hole part fine processing unit 42 and round hole part processing unit 43 may be realized not only using software, but also using a hardware circuit such as a field programmable gate array (FPGA), an ASIC chip or a complex programmable logic device (CPLD).

Another embodiment of the present invention also discloses a system for making a cooling hole in a workpiece, the system comprising: a laser 30, for generating a laser pulse onto the workpiece; and a controller 40, in which is stored a program for realizing the abovementioned method for making a cooling hole in a workpiece.

Another embodiment of the present invention also discloses a machine readable storage medium, in which are stored commands for making a machine perform the abovementioned method for making a cooling hole in a workpiece.

The embodiments above are merely preferred embodiments of the present invention, which are not intended to define the scope of protection of the present invention. Suitable improvements may be made to the preferred embodiments according to the present invention during specific implementation, to suit the specific requirements of the particular circumstances. Thus, it can be understood that the particular embodiments of the present invention mentioned herein merely serve a demonstrative function, and are not intended to limit the scope of protection of the present invention.

The invention claimed is:

1. A method for making a cooling hole in a workpiece using laser light, the cooling hole including a trapezoidal-shaped hole part, the method comprising:
forming an image of a processing region on the workpiece via an image sensor which collects visible light emitted by the processing region of the workpiece and transmitting the image to a controller;
emitting a first laser pulse to a rough processing part of the trapezoidal-shaped hole part at a position on the workpiece where the trapezoidal-shaped hole part is to be made at a surface of the workpiece, according to geometric parameters of the trapezoidal-shaped hole part, to remove material of the workpiece at the rough processing part and complete rough processing of the trapezoidal-shaped hole part;

emitting a second laser pulse only when emitted laser light will impact a processing remainder part of the trapezoidal-shaped hole part other than the rough processing part of the trapezoidal-shaped hole part, according to geometric parameters of the trapezoidal-shaped hole part, to remove only remaining material of the workpiece according to the geometric parameters at the processing remainder part and complete fine processing of the trapezoidal-shaped hole part; and determining whether processing is complete based on the image of the processing region, wherein energy of the first laser pulse is greater than energy of the second laser pulse.

2. The method of claim 1, wherein the emitting of the first laser pulse includes:

selecting multiple processing regions at the rough processing part according to geometric parameters of the trapezoidal-shaped hole part, and emitting first laser pulses to the selected processing regions to remove material of the workpiece at the rough processing part, thereby completing rough processing of the trapezoidal-shaped hole part.

3. The method of claim 1, wherein the cooling hole further includes a round hole part in communication with the trapezoidal-shaped hole part, and the method further comprising:

emitting the first laser pulse to a position on the workpiece where the round hole part is to be made, according to geometric parameters of the round hole part, to remove material of the workpiece at the position extending from the trapezoidal-shaped hole part where the round hole part is to be made, and to make the round hole part.

4. The method of claim 1, wherein the first laser pulse is of a millisecond level, and the second laser pulse is of a level smaller than a nanosecond level.

5. A device for making a cooling hole in a workpiece using laser light, the cooling hole including a trapezoidal-shaped hole part, the device comprising:

an image sensor configured to collect visible light emitted by a processing region of the workpiece, and form an image of the processing region and transmit said image to a controller;

a shaped hole part rough processing unit to emit a first laser pulse to a rough processing part at a position of the trapezoidal-shaped hole part, according to geometric parameters of the trapezoidal-shaped hole part, to remove material of the workpiece at the rough processing part and complete rough processing of the trapezoidal-shaped hole part; and a shaped hole part fine processing unit to emit a second laser pulse only when emitted laser light will impact a processing remainder part other than the rough processing part of the trapezoidal-shaped hole part, according to geometric parameters of the trapezoidal-shaped hole part, to remove only remaining material of the workpiece according to the geometric parameters at the processing remainder part and complete fine processing of the trapezoidal-shaped hole part;

wherein energy of the first laser pulse is greater than energy of the second laser pulse, and wherein the controller is configured to determine whether processing is complete based on the image of the processing region.

6. The device of claim 5, wherein the shaped hole part rough processing unit is further configured to: select multiple processing regions at the rough processing part according to geometric parameters of the trapezoidal-shaped hole part, and emit first laser pulses to the selected processing regions to remove material of the workpiece at the rough processing part, thereby completing rough processing of the trapezoidal-shaped hole part.

7. The device of claim 5, wherein the cooling hole further includes a round hole part, the device further comprising:

a round hole part processing unit to emit a first laser pulse to a position on the workpiece where the round hole part is to be made, according to geometric parameters of the round hole part, to remove material of the workpiece at the position where the round hole part is to be made and make the round hole part.

8. The device as claimed in claim 5, wherein the first laser pulse is of a millisecond level, and the second laser pulse is of a level smaller than a nanosecond level.

9. A system for making a cooling hole in a workpiece, comprising:

a laser to generate a laser pulse onto the workpiece;

a controller; and an image sensor configured to collect visible light emitted by a processing region of the workpiece, and form an image of the processing region and transmit said image to the controller, wherein the controller is configured to store a program to cause, when executed, the laser to emit a first laser pulse to a rough processing part at a position on the workpiece where a trapezoidal-shaped hole part is to be made, according to geometric parameters of the trapezoidal-shaped hole part, to remove material of the workpiece at the rough processing part and complete rough processing of the trapezoidal-shaped hole part; and emit a second laser pulse only when emitted laser light will impact a processing remainder part other than the rough processing part of the trapezoidal-shaped hole part, according to geometric parameters of the trapezoidal-shaped hole part, to remove only remaining material of the workpiece according to the geometric parameters at the processing remainder part and complete fine processing of the trapezoidal-shaped hole part;

wherein energy of the first laser pulse is greater than energy of the second laser pulse.

10. A non-transitory computer readable storage medium including program code segments which, when executed on a computer,perform the method of claim 1.

11. The method of claim 2, wherein the cooling hole includes a round hole part in communication with the trapezoidal-shaped hole part, and the method further comprising:

emitting a first laser pulse to a position on the workpiece where the round hole part is to be made, according to geometric parameters of the round hole part, to remove material of the workpiece at the position where the round hole part is to be made, and to make the round hole part.

12. The method of claim 2, wherein the first laser pulse is of a millisecond level, and the second laser pulse is of a level smaller than a nanosecond level.

13. The method of claim 3, wherein the first laser pulse is of a millisecond level, and the second laser pulse is of a level smaller than a nanosecond level.

14. The device of claim 6, wherein the cooling hole further includes a round hole part, the device further comprising:
a round hole part processing unit to emit a first laser pulse to a position on the workpiece where the round hole part is to be made, according to geometric parameters of the round hole part, to remove material of the workpiece at the position where the round hole part is to be made and make the round hole part.

15. The device as claimed in claim 6, wherein the first laser pulse is of a millisecond level, and the second laser pulse is of a level smaller than a nanosecond level.

16. The device as claimed in claim 7, wherein the first laser pulse is of a millisecond level, and the second laser pulse is of a level smaller than a nanosecond level.

17. A device for making a cooling hole in a workpiece using laser light, the cooling hole including a trapezoidal-shaped hole part, the device comprising:
at least one processor configured to execute computer-readable instructions to
collect, via a sensor, visible light emitted by a processing region of the workpiece, and form an image of the processing region and transmit said image to a controller,
cause a laser to emit a first laser pulse to a rough processing part at a position of the trapezoidal-shaped hole part, according to geometric parameters of the trapezoidal-shaped hole part, to remove material of the workpiece at the rough processing part and complete rough processing of the trapezoidal-shaped hole part, and
cause the laser to emit a second laser pulse only when emitted laser light will impact a processing remainder part other than the rough processing part of the trapezoidal-shaped hole part, according to geometric parameters of the trapezoidal-shaped hole part, to remove only remaining material of the workpiece according to the geometric parameters at the processing remainder part and complete fine processing of the trapezoidal-shaped hole part, wherein energy of the first laser pulse is greater than energy of the second laser pulse.

18. The device of claim 17, wherein the at least one processor is further configured to: select multiple processing regions at the rough processing part according to geometric parameters of the trapezoidal-shaped hole part, and emit first laser pulses to the selected processing regions to remove material of the workpiece at the rough processing part, thereby completing rough processing of the shaped hole part.

19. The device of claim 17, wherein the cooling hole further includes a round hole part, the device further comprising:
a round hole part processing unit to emit a first laser pulse to a position on the workpiece where the round hole part is to be made, according to geometric parameters of the round hole part, to remove material of the workpiece at the position where the round hole part is to be made and make the round hole part.

20. The device as claimed in claim 17, wherein the first laser pulse is of a millisecond level, and the second laser pulse is of a level smaller than a nanosecond level.

21. A system for making a cooling hole in a workpiece, comprising:
a laser to generate a laser pulse onto the workpiece; and
the device of claim 17.

22. The method of claim 1, wherein the removing the material of the workpiece at the rough processing part and the completing of the rough processing of the trapezoidal-shaped hole part is executed in a shape conformal with a final shape defined by the geometric parameters.

23. The method of claim 1, wherein during the fine processing, the method includes avoiding the rough processing part by only emitting second laser pulses to the processing remainder part.

* * * * *